United States Patent [19]
Anderson

[11] 3,906,112
[45] Sept. 16, 1975

[54] EXTRACTION OF CAROTENOID PIGMENT FROM SHRIMP PROCESSING WASTE

[75] Inventor: Lyle K. Anderson, Warrenton, Oreg.

[73] Assignee: Bioproducts Incorporated, Warrenton, Oreg.

[22] Filed: Sept. 16, 1974

[21] Appl. No.: 506,280

[52] U.S. Cl. .................. 426/1; 426/250; 426/540; 426/437
[51] Int. Cl.² ........................................... A23L 1/27
[58] Field of Search ....... 426/1, 177, 253, 256, 263, 426/437, 229

[56] References Cited
UNITED STATES PATENTS

| | | | |
|---|---|---|---|
| 353,822 | 12/1886 | Sahlström | 426/437 |
| 1,083,769 | 1/1914 | Suzuki | 426/229 |
| 1,824,685 | 9/1931 | Pittock | 426/437 |

*Primary Examiner*—Jeanette M. Hunter
*Attorney, Agent, or Firm*—Kolisch, Hartwell, Dickinson & Stuart

[57] ABSTRACT

Extracting a red carotenoid pigment from processing waste which comprises a milky-pink watery mixture containing dissolved and finely divided material from the waste. To this is added a small quantity of a triglyceride oil, such as soybean oil. The oil is dispersed in the watery mixture with the aid of turbulent mixing, after which the dispersion is heated and the oil fraction recovered by centrifugal extraction. The resulting dark-red oil is suitable for incorporation in commercially produced salmon and trout feed to improve the fishes' flesh and skin coloration.

9 Claims, 1 Drawing Figure

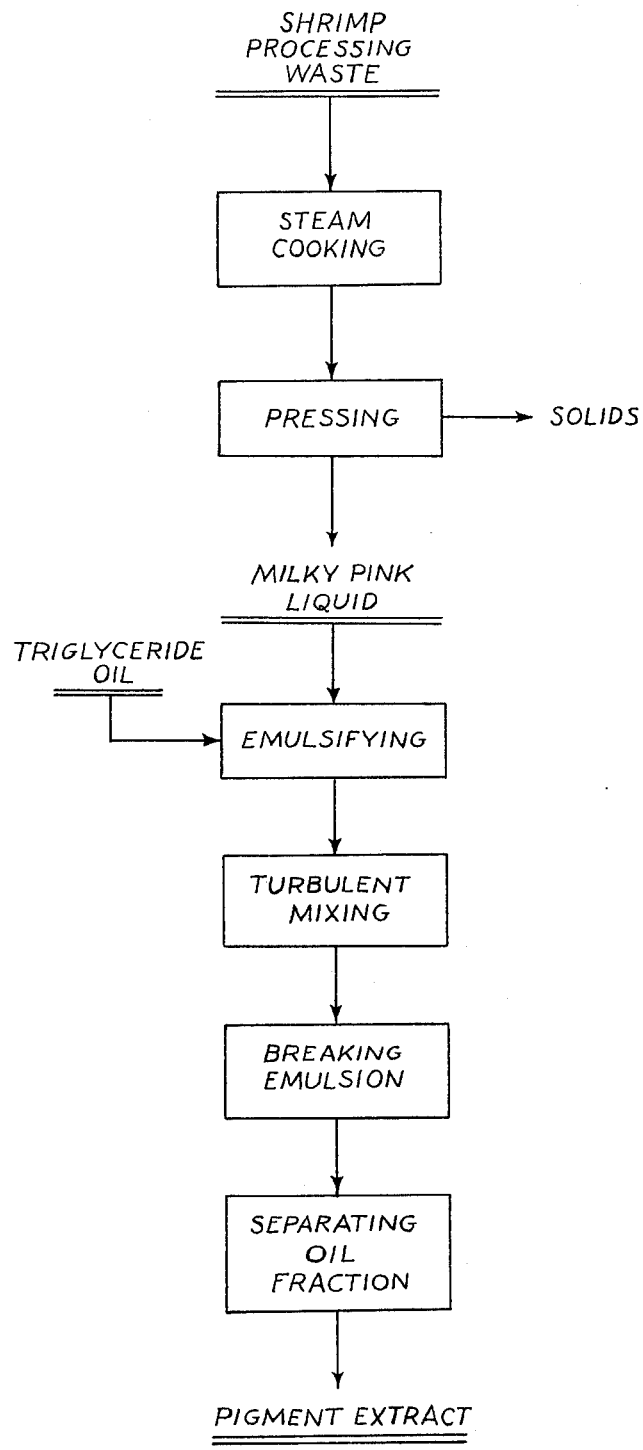

EXTRACTION OF CAROTENOID PIGMENT FROM SHRIMP PROCESSING WASTE

BACKGROUND OF THE INVENTION

Salmon and trout raised in hatcheries or fish farms generally lack the skin and flesh color characteristic of fish which spend their life in a natural environment. The differences in pigmentation between farm-raised and native fish are of significant concern to commercial fish farmers, since there is a strong consumer preference for salmon and trout having dark orange or reddish flesh and bright external markings. Since fish in the Oncorhynchus, Salmo, and Trutta families derive their reddish flesh and skin pigmentation from dietary sources, many attempts have been made to improve the coloration of farm-raised fish by incorporating a red coloring agent in their diet. Color-producing additives for which some success has been reported include paprika and the synthetic carotenoid pigment canthaxanthin. In the commercial production of fish for human consumption, however, it is preferable to avoid the use of coloring agents which are not derived from sources in the fish's natural environment.

The material predominantly responsible for the orange or reddish flesh color in native salmon has been identified as the red carotenoid pigment astaxanthin (astacin), which is also present in the shells and tissues of shrimp and other crustaceans. According to one study, hatchery trout fed a diet supplemented with shrimp meal, a pink-colored shrimp processing by-product comprised of ground-up and dried exoskeletal material, showed improved flesh and skin color. However, since shrimp meal contains a relatively small weight percentage of the pigment, only a limited amount of improvement can be obtained by feeding shrimp meal unless the fish are fed large quantities of the meal for a considerable length of time.

OBJECTS AND SUMMARY OF THE INVENTION

Accordingly, it is a general object of the present invention to provide a concentrated form of naturally occurring marine animal pigment in a form suitable for feeding to fish.

A more specific object of the invention is to provide a carotenoid pigment extract of shrimp shell waste in the form of a triglyceride solution of the pigment.

A related object of the invention is to provide a method for extracting the red-colored carotenoid pigment from crustacean shell waste.

Still another object is to provide a method for recovering the red, oil-soluble pigment present in finely divided form in shrimp processing waste streams.

In accordance with the present invention, there is provided a method for preparing an oil extract of the carotenoid pigment present in crustacean shell waste which comprises dispersing a small quantity of oil, suitably a triglyceride oil, in a large quantity of a watery mixture containing finely divided crustacean exoskeletal material. After a suitable period of mixing, during which oil-soluble pigment present in the watery mixture dissolves in the oil, the oil fraction of the dispersion is separated out to provide an oil-base pigment concentrate which may be incorporated in conventional, commercially produced salmon and trout feed.

The nature and scope of the present invention together with other objects, features, and advantages thereof, will become more apparent from a reading of the following detailed description in conjunction with the accompanying drawing, a flow diagram illustrating a preferred embodiment of the invention.

DETAILED DESCRIPTION

In producing the red carotenoid pigment extract of the invention, the preferred pigment source material is shrimp processing waste, the broken-up exoskeleton remaining after shrimp are shelled and cleaned in a commercial shrimp canning operation. While crab, lobster, and other crustacean shells also may be used as a source of the desired pigment, shrimp and red crab shells generally contain a higher weight percentage of the pigment and are available in large volume from commercial shrimp canneries. The shells should be as fresh as possible, and not stored for an excessive length of time before being used, since the pigment in them is gradually destroyed by oxidation.

According to one embodiment of the invention, illustrated in the accompanying drawing, shrimp processing waste as received from a cannery, i.e., fresh wet shell waste having a moisture content of about 80–85 percent, is first cooked at atmospheric pressure by direct steaming, then pressed to extract the condensed steam and other liquid matter. The expressed watery liquid, which contains natural oils, dissolved and suspended proteinaceous material and chitin fragments, has a slightly milky pink appearance and typically contains about 2–5 percent solids by weight.

The steam cooking step may be carried out as a batch-type process, as by introducing low pressure steam into a stirred vat containing the shell waste, or, more conveniently, as a continuous operation using a continuous screw cooker of the type conventionally used in the wet reduction of fish. Typically, the waste is cooked sufficiently to coagulate most of the dissolved protein in the associated liquid. Cooking conditions are not critical, however, and may be varied to provide optimum pigment yield. Pressing of the cooked waste is done in any convenient manner, and likewise is not critical. A conventional screw press may be used, for example. If desired, the cooked waste may be screened to remove free-draining liquid matter before pressing.

To the hot watery matter from the (screening and) pressing operation(s), commonly known as "stickwater," is added a small quantity of a triglyceride oil, such as soybean oil, in a ratio of about 6–8 gallons of oil per 1,000 gallons of stickwater. The oil substantially disperses as it is added, the protein content of the watery mixture acting as an emulsifying agent. Dispersion of the oil is aided by turbulent mixing of the liquid. The mixing is continued for a suitable length of time, typically 30 to 60 minutes, during which oil-soluble carotenoid pigment associated with the finely divided exoskeletal material in the watery mixture dissolves in the dispersed oil. After sufficient mixing, the dispersion, or emulsion, is broken and the oil fraction of the mixture separated off, suitably by adding salt to the dispersion (about 100 lbs. per 1000 gals.) and heating it to about 175°–190° F., then recovering the oil phase using a conventional liquid-liquid centrifugal extractor. The recovered oil has a deep red color from the dissolved carotenoid pigment. To prevent degradation of the pigment, the colored oil product should be stored in a nonoxidizing atmosphere, away from light and heat, and preferably under refrigeration. A chemical antioxidant, such as butylated hydroxyanisole (BHA) or butylated hydroxytoluene (BHT) also may be added.

For use in enhancing the coloration of salmon and trout, a suitable quantity of the oil is blended with the fish's diet. Farm-raised salmon conventionally are fed a moist food, known as the Oregon Moist Pellet, and the pigmented oil may be substituted for a portion of the triglyceride content normally used in the diet formulation. The pigmented oil also may be added to dry trout feed formulations, but care must be taken to avoid excessive oxidation of the pigment.

According to an alternative embodiment of the invention, the triglyceride oil is mixed with the shell waste prior to cooking, then removed during the subsequent pressing operation, along with the watery matter which contains portions of the waste in finely divided form. This method of incorporating the oil into the watery mixture results in a final product which contains a somewhat higher percentage of pigment, but has the disadvantage that some of the oil adheres to the shell waste and is not recovered during the pressing operation.

Illustrating specifically the extraction of red carotenoid pigment from shrimp processing waste as contemplated herein, about 12,000 pounds (wet weight) of fresh shrimp shell waste is cooked with low pressure steam in a continuous screw cooker having a diameter of about 24 inches and a length of about 25 feet. Sparge steam enters the cooker through jets distributed uniformly along the length of the tube. After cooking, condensed steam and free-draining liquid is removed from the shells using a rotating 20-mesh screen about 3 feet in diameter and about 5 feet long. Additional liquid containing portions of the shell waste in finely divided form is removed by pressing in a continuous screw press having a diameter of about 15 inches and a length of about 5 feet. About 1,000 gallons of slightly milky-pink, watery liquid matter is obtained from the combined screening and pressing, about two-thirds of the total coming from the pressing operation. Six gallons of neutral soybean oil is then added to the liquid, which is at a temperature of about 140° F. The oil disperses, aided by turbulent mixing of the liquid which is continued for about 30 minutes. During the mixing period, the dispersion is heated with sparge steam, and reaches a temperature of about 180° F. at the end of the period. Finally, 100 pounds of salt is dissolved in the mixture and the oil fraction separated off using a conventional liquid-liquid centrifugal extractor. The recovered oil has a very deep red, almost black, coloration from dissolved shrimp shell pigment.

From the foregoing description it will be seen that a method is contemplated for preparing a pigment extract of crustacean shell waste which comprises, among other steps, preparing from the waste a watery mixture comprising finely divided portions of the waste containing the pigment, incorporating a triglyceride oil in the mixture to provide an aqueous dispersion containing the oil as a dispersed phase, then separating the oil phase containing the pigment in dissolved form. The pigmented oil product thereby obtained may be used in a variety of ways, including adding it to salmon and trout feed to improve their skin and/or flesh coloration. The pigmented oil also has utility as an edible coloring agent for food products, such as canned fish.

As should be apparent, the method of the invention is relatively simple to carry out, with relatively little attention to the operating conditions being required. With the process contemplated, pigment may be extracted from shrimp shell waste, and the waste thereafter converted into other products of commercial value, such as shrimp meal having a substantial protein content.

While certain embodiments of the invention have been described herein, it will be understood that variations and modifications are possible without departing from the spirit of the invention. For example, the pigment concentration of the extract may be increased by a counter-current procedure in which the initially-obtained extract is used in place of all or part of the oil added in a subsequent extraction operation.

It is claimed and desired to secure by Letters Patent:

1. A method for preparing a carotenoid pigment extract of crustacean shell waste, comprising
   preparing from said waste a watery mixture comprising finely divided portions of said waste, which portions contain said pigment,
   incorporating an oil in said mixture to produce an aqueous dispersion containing said oil as a dispersed phase, and
   separating from said dispersion the oil phase thereof, which phase contains the pigment extract.

2. The method of claim 1, wherein said preparing step comprises contacting crustacean shell waste with steam, pressing the waste to remove watery material associated therewith, and collecting the watery material, which material comprises said watery mixture.

3. The method of claim 1, wherein said preparing and incorporating steps comprise adding an oil to the crustacean shell waste, contacting the oil-containing waste with steam, then pressing the waste to remove watery material associated therewith, which watery material comprises a dispersion containing said oil as a dispersed phase.

4. The method of claim 1, wherein said separating is performed by centrifugal extraction.

5. The method of claim 1, wherein said crustacean shell waste comprises shrimp shell waste, and said pigment comprises the carotenoid pigment astaxanthin.

6. The method of claim 1, wherein said oil comprises a triglyceride.

7. The pigment extract produced by the method of claim 1.

8. A method for preparing a carotenoid pigment extract of crustacean shell waste in a form suitable for feeding to fish, comprising
   preparing from said waste a watery mixture comprising finely divided portions of said waste which include said pigment,
   incorporating an edible oil in said mixture to produce an aqueous dispersion containing said oil as a dispersed phase, separating from said dispersion the oil phase thereof, which phase contains said pigment in solution, and
   incorporating the pigment-bearing oil in a fish food formulation.

9. A method for preparing a carotenoid pigment extract of shrimp shell waste in a form suitable for feeding to fish of the genera Oncorhyneus, Trutta and Salmo, comprising
   preparing from said waste a watery mixture comprising finely divided portions of said waste which include said pigment, dispersing a triglyceride oil in said mixture to provide an aqueous dispersion containing said oil as a dispersed phase, separating from said dispersion the oil phase thereof which contains dissolved carotenoid pigment from said waste, and incorporating portions of said pigment-containing oil in a food formulation for said fish.

* * * * *